Aug. 6, 1940.  L. R. LUDWIG  2,210,682

MERCURY ARC RECTIFIER

Filed April 28, 1938

WITNESSES:
Leon M. Garman
Roy W. Bailey

INVENTOR
Leon R. Ludwig.
BY
S. A. Strickett
ATTORNEY

Patented Aug. 6, 1940

2,210,682

UNITED STATES PATENT OFFICE 2,210,682

MERCURY ARC RECTIFIER

Leon R. Ludwig, Wilkinsburg, Pa., assignor to Westinghouse Electric & Manufacturing Company, East Pittsburgh, Pa., a corporation of Pennsylvania Application April 28, 1938, Serial No. 204,776

3 Claims. (Cl. 250—27.5)

My invention relates to rectifiers and especially to rectifiers having a vaporizable cathode such as mercury.

An object of my invention is to provide a rectifier with the lowest possible arc drop.

Figure 1:
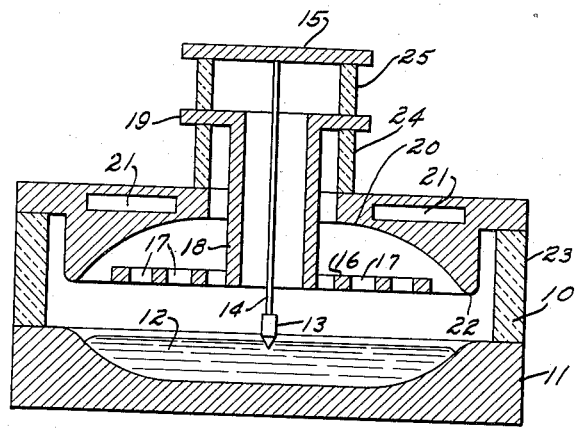
Figure 2:
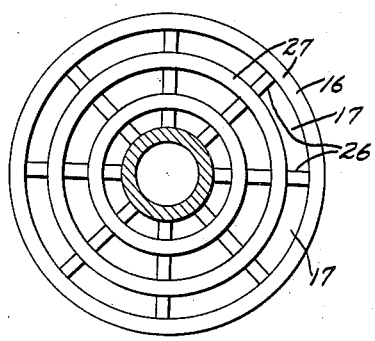
Figure 3:
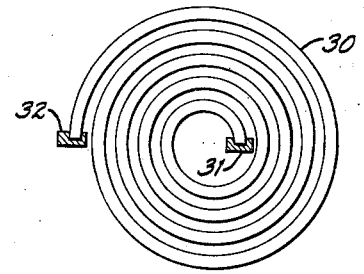
Figure 4:
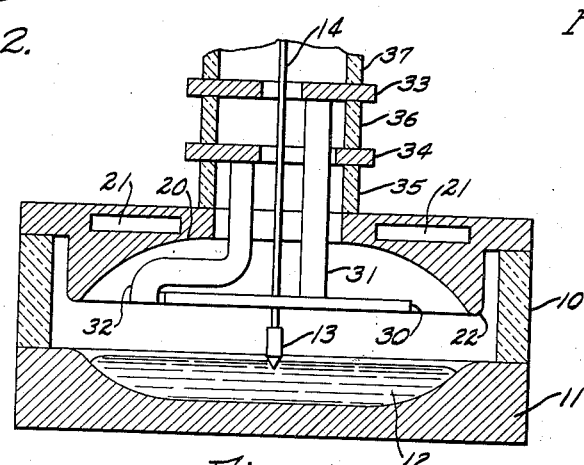

Other objects and advantages of the invention will be apparent from the following description and drawing, in which Figure 1 is a cross-sectional view through a preferred embodiment of my invention, Fig. 2 is a top plan view of a preferred anode construction, Fig. 3 is a modification of the anode structure of Fig. 2; and Fig. 4 is a cross-sectional view of a part of the rectifier casing with a side elevation of the anode of Fig. 3.

Various modifications have been made in the structure of a rectifier including the positioning of various elements between the anode and the cathode. The results of the interpositioning of these various elements has been to increase the arc drop and to lower the efficiency of the rectifier in order to obtain suitable condensation of the mercury vapor and return thereof to the cathode pool. My invention provides for obtaining this suitable condensation of the mercury without increased arc drop, lowered efficiency and the complicated assembly that results from interposing these various elements between the anode and liquid cathode. In particular, my invention contemplates utilizing an anode having openings therethrough located above the liquid cathode and having a cooled surface above these openings for the condensation of the mercury thereon.

My invention also contemplates having this cooled surface dome-shaped so that the mercury will run to an edge located outside the anode space and drop therefrom to the mercury pool below.

Fig. 1 is a preferred construction embodying my invention. The recifier has a casing 10 composed of both metal and suitable insulation. The lower portion 10 is preferably of steel having a depression for the location of the mercury pool 12 therein. Immersed to some extent in this pool is a make-alive 13, preferably of boron carbide with its lead 14 connected to a conductive portion 15 of the casing. While I prefer the make-alive construction illustrated, other types of auxiliary electrodes would be utilized for the purpose of starting the arc discharge.

The anode structure consists preferably of a disk-like portion 16 extending parallel with the surface of the mercury and having opening 17 therethrough. The anode is preferably supported by a conductive tube 18 surrounding the make-alive lead 14 and extending to a conductive portion 19 of the casing. Above these openings 17 in the anode is a surface 20 preferably having conduits 21 adjacent thereto for a medium, such as water, to cool the surface 20. The surface 20 is preferably curved in a preferably dish-shaped or dome-shaped contour to an edge 22 outside the area occupied by the anode 16. Suitable insulation 23, 24 and 25 separates the various conductive metal portions of the device and this insulation is preferably porcelain cylinders sealed by means of its glass glaze to the metal portions of the case.

In operation, the auxiliary electrode 13 initiates a discharge at the surface of the liquid cathode 12 and the discharge strikes across the vapor space to the anode 16. The vapor from the cathode surface passes through the opening 17 and strikes the cooled surface 20. The mercury condenses on the surface 20 and rolling down the surface to the edge 22, drops to the pool 12.

In Fig. 2, there is illustrated a preferred type of anode composed of rods 26 and circular strips 27. The heat of operation will generally maintain the anode at a temperature sufficiently warm or hot to prevent any mercury condensing thereon. If desired, the circular strips 27 may be made in the form of a spiral and a heating current passed therethrough to insure that the anode will have a sufficient temperature to prevent mercury condensing thereon. Such a heating temperature may be applied to the anode at the beginning of the opertion and then disconnected when the anode is sufficiently heated to be maintained at a suitable temperature by the heat of the discharge.

In Fig. 3, I have illustrated a spiral ribbon anode 30 especially designed for the maximum passage of mercury vapor therethrough and also, if desired, of a suitable heating current. This ribbon is preferably of refractory material such as tungsten or molybdenum.

In Fig. 4, I have illustrated one method of utilizing such an anode. The inner and outer ends of the spiral have the supporting connectors 31 and 32 extending therefrom to conductive portions 33 and 34 of the tube wall. In the particular embodiment illustrated these conductive portions 33, 34 are disks sealed between insulation cylinders, preferably of glass-coated porcelain, 35, 36, and 37.

It will be noted that the openings between adjacent turns of the spiral in Fig. 3 occupy most of the cross-sectional area through the anode. I prefer to have the area of the openings at least 50% of the anode area exposed to the cathode so that the mercury vapor will readily pass therethrough to the cooled surface beyond.

The anode may have various shapes in addition to those illustrated such as grid shaped, or may be a plate with square or round holes punched therethrough. The casing of the discharge device in which the anode is inserted may also be modified extensively from that disclosed to include a greater proportion of metal walls or a greater proportion of insulating walls.

While I have disclosed preferred embodiments of my invention, it is apparent that many modifications may be made therein in addition to those disclosed without departing from the spirit of my invention. Accordingly, I desire only such limitation to be imposed upon the following claims as is necessitated by the prior art.

I claim as my invention:

1. A vapor electric device comprising a cathode dish, a mercury cathode pool in said dish, a cooled condensing surface providing the top of said device, an insulating ring separating said cathode dish from said condensing surface, an anode interposed between said cathode and said condensing surface said anode being provided with a plurality of openings through which the cathode vapor flows from said cathode to said condensing surface.

2. A vapor electric device comprising a cathode dish, a mercury cathode pool in said dish, a cooled condensing surface providing the top of said device, an insulating ring separating said cathode dish from said condensing surface, an anode interposed between said cathode and said condensing surface said anode being provided with a plurality of openings through which the cathode vapor flows from said cathode to said condensing surface, said condensing surface being dome shaped whereby the condensed cathode vapor is returned to the sides of the cathode pool.

3. A vapor electric device comprising a metallic cathode dish, a pool of vaporizable cathode material in said dish, a metallic top section providing a dome shaped condensing surface opposed to the surface of the cathode, an insulator separating said top from said cathode dish and sealed in vacuum tight relation thereto, a substantially flat grid-like anode interposed between said cathode and said condensing surface whereby the cathode vapor flows through said anode from said cathode to said condensing surface.

LEON R. LUDWIG.